US009126488B2

(12) United States Patent
Hiroe (10) Patent No.: US 9,126,488 B2
(45) Date of Patent: Sep. 8, 2015

(54) CHARGING DEVICE AND CHARGING METHOD

(75) Inventor: Yoshihiko Hiroe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 130 days.

(21) Appl. No.: 14/113,172

(22) PCT Filed: Apr. 22, 2011

(86) PCT No.: PCT/JP2011/059902
§ 371 (c)(1),
(2), (4) Date: Oct. 21, 2013

(87) PCT Pub. No.: WO2012/144060
PCT Pub. Date: Oct. 26, 2012

(65) Prior Publication Data
US 2014/0042968 A1    Feb. 13, 2014

(51) Int. Cl.
*H01M 10/46* (2006.01)
*B60L 11/18* (2006.01)
*H01M 10/44* (2006.01)
*H02J 7/04* (2006.01)

(52) U.S. Cl.
CPC ........... *B60L 11/1809* (2013.01); *B60L 11/187* (2013.01); *B60L 11/1811* (2013.01); *B60L 11/1848* (2013.01); *B60L 11/1861* (2013.01); *H01M 10/443* (2013.01); *H01M 10/46* (2013.01); *H02J 7/047* (2013.01); *B60L 11/185* (2013.01); *B60L 11/1838* (2013.01); *B60L 2260/56* (2013.01); *H01M 2220/20* (2013.01); *Y02T 10/705* (2013.01); *Y02T 10/7005* (2013.01); *Y02T 10/7044* (2013.01); *Y02T 90/121* (2013.01); *Y02T 90/127* (2013.01); *Y02T90/128* (2013.01); *Y02T 90/14* (2013.01); *Y02T 90/169* (2013.01); *Y04S 30/14* (2013.01)

(58) Field of Classification Search
CPC ........... H02J 7/0091; H02J 7/04; H02J 7/047; H02J 7/1446; H02J 7/1453
USPC ................... 320/104, 109, 128, 135, 150, 160
See application file for complete search history.

(56) References Cited

U.S. PATENT DOCUMENTS

| | | | |
|---|---|---|---|
| 6,075,346 A | 6/2000 | Kikuchi et al. | |
| 2002/0003417 A1* | 1/2002 | Bito et al. | 320/152 |
| 2005/0099154 A1 | 5/2005 | Ohnuma et al. | |
| 2008/0238355 A1* | 10/2008 | Muramatsu | 320/101 |
| 2010/0019729 A1 | 1/2010 | Kaita et al. | |

FOREIGN PATENT DOCUMENTS

| | | |
|---|---|---|
| JP | 11-187577 | 7/1999 |
| JP | 2000-197212 | 7/2000 |
| JP | 2001-314046 | 11/2001 |
| JP | 2002-165380 | 6/2002 |
| JP | 2002-204538 | 7/2002 |
| JP | 2002-233070 | 8/2002 |

* cited by examiner

*Primary Examiner* — Edward Tso
(74) *Attorney, Agent, or Firm* — Finnegan, Henderson, Farabow, Garrett & Dunner, LLP (57) ABSTRACT

A charging device for charging a battery (10) by an external power supply (2) includes a temperature sensor (46) for detecting the temperature of the battery, a charger (4) receiving electric power from the external power supply to charge the battery, and a control device (50) controlling the charger such that the battery is charged at a charging rate determined based on the temperature difference between a charging/discharging limitation start temperature and the battery temperature. Preferably, the control device (50) determines the charging rate based on the difference between the amount of charge corresponding to full charge of the battery (10) and the current remaining amount of charge, and the temperature difference. Preferably, the vehicle (100) on which the battery (10) is mounted repeatedly carries out charging and vehicle-running. The control device (50) determines the charging rate according to the temperature increase expected amount when the vehicle runs next time.

4 Claims, 8 Drawing Sheets

CHARGING DEVICE AND CHARGING METHOD

CROSS-REFERENCE TO RELATED APPLICATIONS

This application is a national phase application of International Application No. PCT/JP2011/059902, filed Apr. 22, 2011, the content of which is incorporated herein by reference.

TECHNICAL FIELD

The present invention relates to a charging device and charging method for a vehicle-mounted battery, particularly to a charging device and a charging method for charging a vehicle-mounted battery by an external power supply.

BACKGROUND ART

In recent years, electric vehicles and hybrid vehicles are attracting attention as environment-friendly vehicles. An electric vehicle has a vehicle-mounted battery charged from an external source. Furthermore, research efforts are now being made to allow a vehicle-mounted battery to be charged from an external source in some hybrid vehicles.

When a vehicle-mounted battery is to be charged from an external source, the time required for charging becomes an issue. Charging must be carried out with high-amperage current to reduce the time required for charging.

Japanese Patent Laying-Open No. 2002-233070 (PTL 1) discloses a battery charging device that allows charging in a short time even if the temperature of the battery is increased during rapid charging.

CITATION LIST

Patent Literature

PTL 1: Japanese Patent Laying-Open No. 2002-233070
PTL 2: Japanese Patent Laying-Open No. 2002-204538
PTL 3: Japanese Patent Laying-Open No. 2002-165380

SUMMARY OF INVENTION

Technical Problem

Under the circumstances where the cost and the weight of the battery are still great, it is difficult to mount on a vehicle a battery having the capacitance that allows the vehicle to run for a long distance without auxiliary charging. There is the need to additionally charge the battery when running for a long distance. Since it is desirable to terminate charging that is carried out during the travel towards a destination in a short period of time, charging is carried out with high-amperage current.

A cooling device is provided since the battery rises in temperature during charging as well as during vehicle-running. The cooling device is generally designed to accommodate the heat generated during vehicle-running. The continuous flow of high-amperage current in rapid charging causes heat to be generated greater in amount than that generated during vehicle-running. However, if the cooling device is designed to comply with rapid charging, the cooling device will become larger in size, leading to increase in weight, cost, and volume. This is not practical for a vehicle.

If rapid charging and vehicle-running are carried out repeatedly, the temperature of the battery will rise. When the temperature of the battery reaches a predetermined value, charging and discharging will be restricted in the aspect of protection as compared to a usual state.

An object of the present invention is to provide a charging device and charging method that allows charging and discharging to be carried out while avoiding limitation by suppressing temperature increase of a vehicle-mounted power storage device.

Solution to Problem

The present invention is directed to a charging device for charging a battery mounted on a vehicle by an external power supply. The vehicle is configured to increase limitation on electric power that is charged to and discharged from the battery according to increase in battery temperature, when the battery temperature exceeds a predetermined temperature. The charging device includes a temperature sensor for detecting a temperature of the battery, a charger receiving electric power from an external power supply to charge the battery, and a control device controlling the charger such that the battery is charged at a charging rate determined based on a temperature difference between the predetermined temperature and the battery temperature.

Preferably, the control device determines the charging rate based on the difference between an amount of charge corresponding to full charge of the battery and the current remaining amount of charge, and the temperature difference.

Preferably, the vehicle on which the battery is mounted is capable of repeatedly executing a charging operation towards the battery from outside the vehicle and a vehicle-running operation. The control device determines the charging rate based on the expected amount of temperature increase when the vehicle runs next time and the temperature difference.

Another aspect of the present invention is directed to a charging method for charging a battery mounted on a vehicle by an external power supply. The vehicle is configured to increase limitation on electric power charged to and discharged from the battery according to increase in battery temperature when the battery temperature exceeds a predetermined temperature. The charging method includes the steps of detecting battery temperature, calculating the temperature difference between the predetermined temperature and the battery temperature, and charging the battery such that charging of the battery is executed at a charging rate determined based on the temperature difference.

Preferably the charging step determines the charging rate based on the difference between an amount of charge corresponding to full charge of the battery and the current remaining amount of charge, and the temperature difference.

Preferably, the vehicle on which the battery is mounted is capable of repeatedly executing a charging operation towards the battery from outside the vehicle and a running operation.

The step of charging determines the charging rate based on the expected amount of temperature increase when the vehicle runs next time and the temperature difference.

Advantageous Effects of Invention

According to the present invention, charging and discharging can be carried out while suppressing temperature increase of a vehicle-mounted power storage device, as well as allowing long-distance running.

DESCRIPTION OF EMBODIMENTS

Embodiments of the present invention will be described in detail with reference to the drawings. In the drawings, the same or corresponding elements have the same reference characters allotted, and description thereof will not be repeated.

First Embodiment

Figure 1:
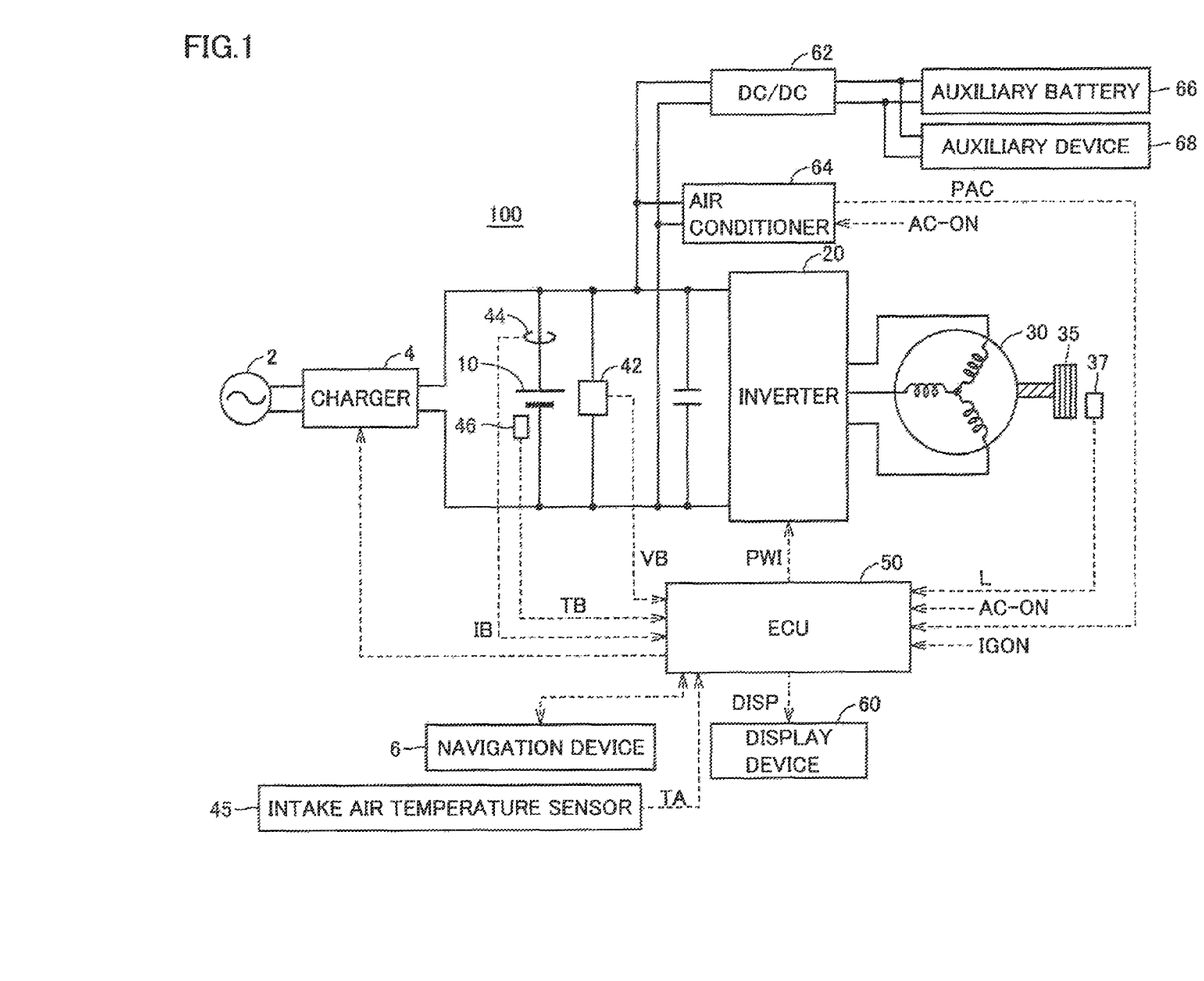
FIG. 1 is an entire block diagram of an electric powered vehicle according to an embodiment of the present invention.

FIG. 1 is an entire block diagram of an electric powered vehicle according to an embodiment of the present invention.

Referring to FIG. 1, an electric powered vehicle 100 includes a battery 10, an inverter 20, a motor generator 30, and a driving wheel 35. Electric powered vehicle 100 further includes a voltage sensor 42, a current sensor 44, a temperature sensor 46, a wheel speed sensor 37, an electric control unit (ECU) 50, a display device 60, a navigation device 6, an intake air temperature sensor 45, and a charger 4. Intake air temperature sensor 45 measures the intake air temperature of the cooling device that cools battery 10, as will be described afterwards with reference to FIG. 2.

Battery 10 is a DC power supply storing the electric power for the vehicle to run. Battery 10 is formed of a secondary battery such as a nickel-metal hydride battery, a lithium ion battery, or the like. Battery 10 is charged by a power supply external to the vehicle by means of charger 4. Charger 4 may be mounted on the vehicle, or may be installed outside. Battery 10 is charged quickly by a power supply 2 installed at a charging station or the like.

In addition, battery 10 is charged by the electric power generated at motor generator 30 via inverter 20 during a braking operation of electric powered vehicle 100 or at the time of reduction in acceleration such as when running down a slope.

Battery 10 outputs the stored electric power to inverter 20. Inverter 20 converts the DC power supplied from battery 10 into 3-phase AC for output to motor generator 30, based on signal PWI from ECU 50 to drive motor generator 30.

During braking or the like of electric powered vehicle 100, inverter 20 converts the 3-phase AC power generated by motor generator 30 into direct current based on signal PWI, and outputs the converted electric power to battery 10. Inverter 20 is formed of a 3-phase PWM inverter, for example, including switching elements of three phases.

Motor generator 30 is a motor generator capable of a power running operation and a regenerative operation. Motor generator 30 is formed of a 3-phase AC synchronous motor generator having a permanent magnet embedded in the rotor.

Motor generator 30 is driven by inverter 20 to generate the traction drive torque to drive driving wheel 35. In the braking operation of electric powered vehicle 100, motor generator 30 receives the kinetic energy of electric powered vehicle 100 from driving wheel 35 to generate power.

Voltage sensor 42 detects a voltage VB of battery 10 to output the detected value to ECU 50. Current sensor 44 detects a current IB input to and output from battery 10, and outputs the detected value to ECU 50. Temperature sensor 46 detects a temperature TB of battery 10 to output the detected value to ECU 50. Wheel speed sensor 37 outputs a pulse generated in accordance with the rotational angle of driving wheel 35. The number of the pulses can be counted by ECU 50 to allow calculation of the running distance L and vehicle speed. As an alternative to wheel speed sensor 37, the rotation speed of motor generator 30 can be detected to obtain the travel distance and/or vehicle speed.

ECU 50 receives the detected values of voltage VB, current IB and temperature TB from voltage sensor 42, current sensor 44 and temperature sensor 46, respectively. Then, ECU 50 generates a PWM signal directed to driving inverter 20, and outputs the generated PWM signal to inverter 20 as a signal PWI.

ECU 50 calculates the state of charge (SOC: also called charging state, remaining amount, and amount of charge) of battery 10 based on the detected values of voltage VB and current IB. The SOC can be calculated using various well-known methods such as the calculation method using the relationship between the open circuit voltage (OCV) and the SOC of battery 10, or the calculation method using the accumulated value of current IB.

Vehicle 100 includes an air conditioner 64, a DC/DC converter 62, an auxiliary device 68, and an auxiliary battery 66 as the device receiving supply of electric power from battery 10. ECU 50 receives information of consumed electric power PAC from air conditioner 64.

Although an electric vehicle is shown as an exemplary vehicle in FIG. 1, the charging device for a vehicle-mounted battery disclosed in the present embodiment may also be applied to a vehicle that includes an internal combustion engine in addition to battery 10 and motor generator 30 such as a plug-in hybrid vehicle, as long as the vehicle is capable of having the vehicle-mounted battery to be charged from a source external to the vehicle.

Figure 2:
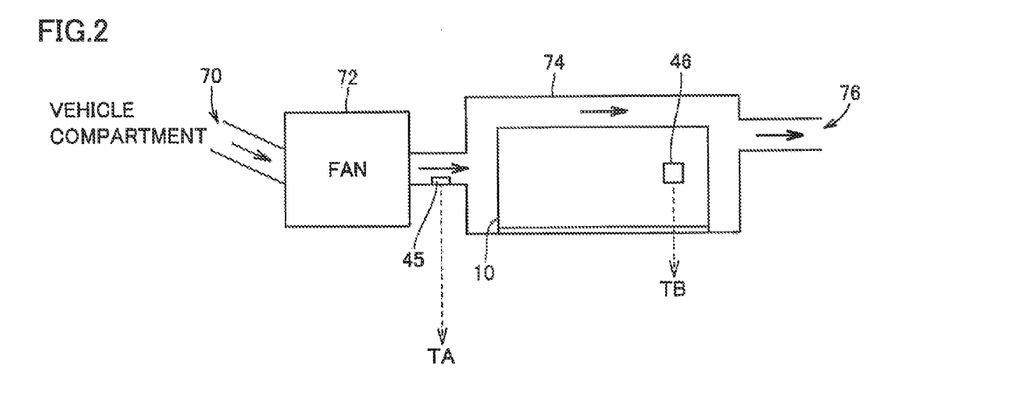
FIG. 2 is a diagram to describe a configuration of a vehicle related to cooling of the power storage device in FIG. 1.

FIG. 2 is a diagram to describe a configuration of the vehicle related to cooling of the power storage device in FIG. 1.

Referring to FIG. 2, the air drawn in by a fan 72 from the vehicle compartment or luggage room or from outside the vehicle via an intake port 70 passes through the interior of a case 74 to cool battery 10. The air absorbing the heat of battery 10 is discharged from a discharge port 76. An intake air temperature sensor 45 is provided at the air channel between fan 72 and case 74. The measured intake air temperature TA is transmitted to ECU 50 of FIG. 1. Further, temperature TB is measured by temperature sensor 46 that detects the temperature of battery 10. The measured temperature TB is transmitted to ECU 50. Although battery 10 may be a capacitor or the like as long as it can store electric energy, an example based on a battery will be described hereinafter.

Electric vehicles and plug-in hybrid vehicles that run using the electric power from the battery rather frequently may require rapid charging. For example, there is the case where the battery is charged during a long-distance travel. The state where the charging current is great will continue when rapid charging is carried out. In comparison, when the vehicle is running, the state where the discharging current is great will not continue so long even if the peak current value is high.

Therefore, the amount of heat generated is greater during rapid charging than during running. If the cooling device of the vehicle is designed to comply with the generated amount of heat in rapid charging, the cooling device will become greater in size and weight, which is not practical. Thus, it is expected that the temperature of the battery will become high even if the cooling device is operated during rapid charging.

For the purpose of suppressing degradation in the lifetime of the battery, the charging and discharging of the battery is restricted when the battery temperature becomes high. Therefore, if the battery temperature rises greatly at the time of rapid charging, subsequent vehicle running will be limited. Measures must be taken in the charging method to avoid the occurrence of such limitation in running.

Figure 3:
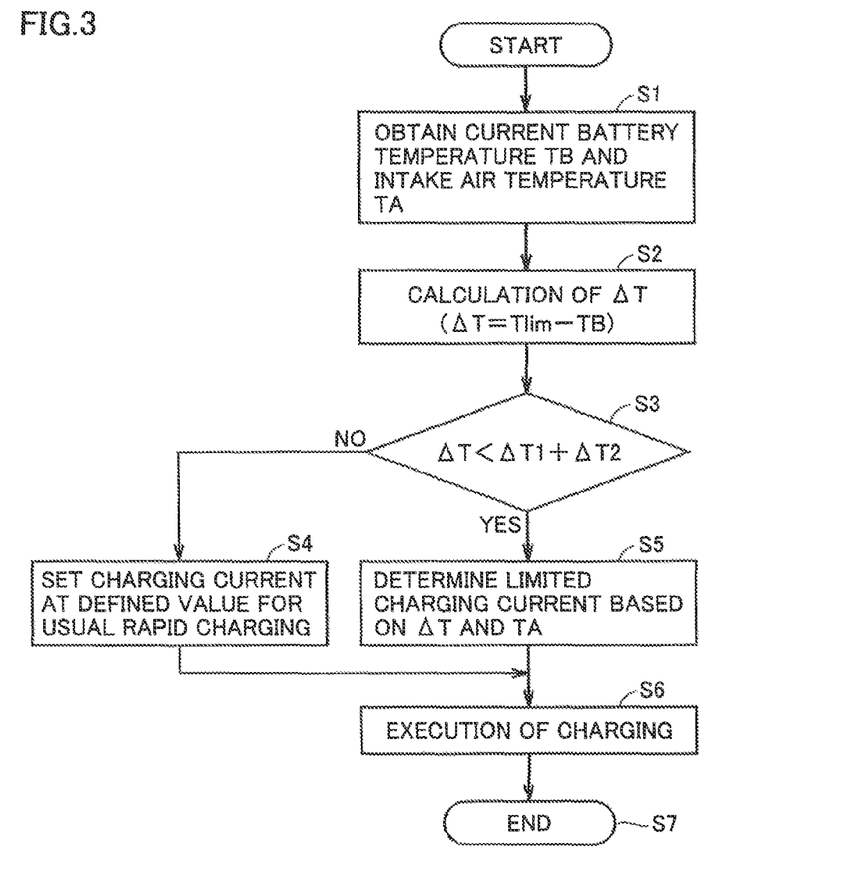
FIG. 3 is a flowchart to describe the process in a charging method executed in the first embodiment.

FIG. 3 is a flowchart to describe the process of the charging method executed in the first embodiment. In the first embodiment, the possible rising temperature is set based on the temperature difference $\Delta T$ between a limitation start temperature Tlim and the battery temperature TB in rapid charging to determine the charging rate in rapid charging. As will be shown in FIG. 5 afterwards, limitation start temperature Tlim is the temperature when the battery charging and discharging will be limited in the case where battery temperature TB reaches that temperature.

Referring to FIG. 3, upon initiation of the process, the current battery temperature TB and intake air temperature TA are obtained at step S1. At step S2, the current battery temperature TB is subtracted from the limitation start temperature Tlim to obtain temperature difference $\Delta T$, as in the following equation (1).

$$\Delta T = Tlim - TB \quad (1)$$

At step S3, a determination is made as to whether the sum of the predetermined temperature $\Delta T1$ that rises in rapid charging and temperature $\Delta T2$ that rises in vehicle-running is larger than $\Delta T$ or not by the following equation (2).

$$\Delta T < \Delta T1 + \Delta T2 \quad (2)$$

In the first embodiment, it is assumed that temperature $\Delta T1$ and temperature $\Delta T2$ are fixed values. For example, temperature $\Delta T1$ may be set as the temperature increasing width corresponding to the rise of the battery temperature when rapid charging is carried out until the battery SOC becomes 100% from the state of 0%. Temperature $\Delta T2$ can be set as the temperature increasing width corresponding to the rise of the battery temperature when the vehicle is made to run at the maximum power until the battery SOC becomes 0% from the state of 100%.

When equation (2) is not met at step S3, control proceeds to step S4. When equation (2) is met at step S3, control proceeds to step S5. At step S4, the charging current is set at the defined value for usual rapid charging. At step S5, a limited charging current is determined based on temperature difference $\Delta T$ and intake air temperature TA.

Figure 4:
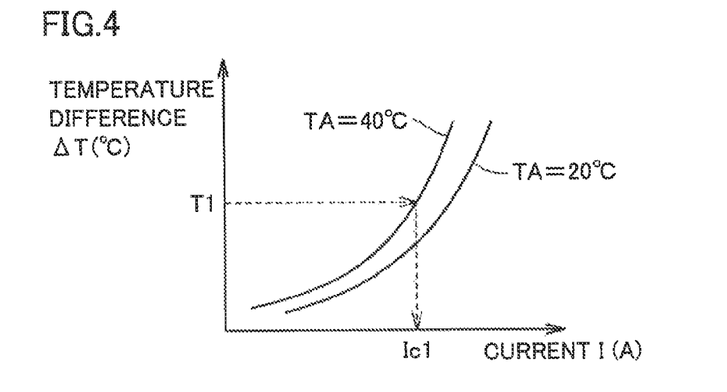
FIG. 4 represents an exemplary map employed in determining charging current at step S5.

FIG. 4 represents an exemplary map employed in determining the charging current at step S5.

Referring to FIG. 4, when intake air temperature TA=40° C. in the case where $\Delta T = T1$, the charging current is determined as charging current I=Ic1.

The margin before reaching limitation start temperature Tlim becomes greater as $\Delta T$ becomes larger. Therefore, the level of charging current can be set higher as a function of a larger $\Delta T$.

Furthermore, the cooling of the battery allows the level of the charging current to be increased as a function of a lower TA. Therefore, in the case where $\Delta T$ is equal, the level of the charging current can be set higher when TA=20° C. than when TA=40° C. More data corresponding to different intake air temperatures (data other than TA=20° C., 40° C.) may be added to the map of FIG. 4.

Referring to FIG. 3 again, following the determination of the charging current at step S4 or step S5, battery charging at the determined charging current is executed at step S6, and the process ends at step S7.

Figure 5:
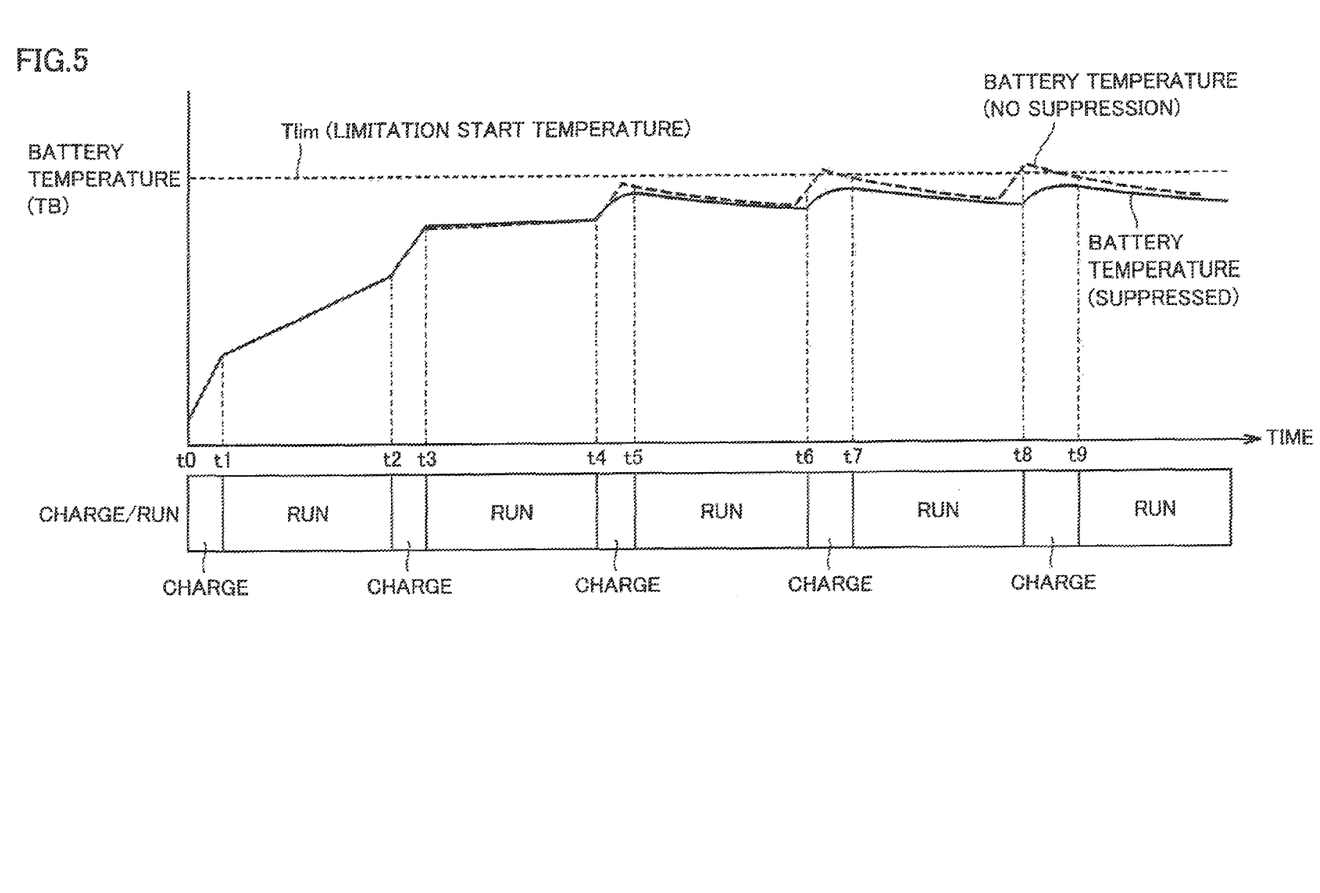
FIG. 5 represents a comparison on battery temperature increase between the case where charging is carried out according to the charging method of the present invention and the case where charging is carried out without applying the present invention.

FIG. 5 represents the comparison in the rise of the battery temperature between the case where charging is carried out by the charging method of the present invention and the case where charging is carried out without applying the present invention.

In FIG. 5, the battery temperature is indicated along the vertical axis, and time is indicated along the horizontal axis. The solid line represents the change in battery temperature TB corresponding to the case where the present invention is applied. The broken line represents the change in battery temperature TB corresponding to the case where common rapid charging is carried out. Limitation start temperature Tlim represents the temperature where the battery charging and discharging is limited by ECU 50 when battery temperature TB reaches the relevant temperature. This limitation start temperature Tlim is set appropriately so that the battery lifetime is not significantly shortened by charging/discharging carried out at high temperature. In other words, the vehicle presented in the present embodiment is configured to increase the restriction on the electric power that is charged to or discharged from the battery according to the rise of battery temperature TB, in the case where battery temperature TB exceeds the predetermined limitation start temperature Tlim.

Following the charging at time t0-t1, the vehicle runs during time t1-t2. Since current flows to the battery during both charging and running, the battery generates heat to cause battery temperature TB to rise. Thereafter, rapid charging carried out at a charging station or the like during time t2-t3, t4-t5, t6-t7, and t8-t9 and discharging caused by running during time t3-t4, t5-t6, t7-t8, t9 and on are repeated.

During the period of time t1-t4, the broken line and solid line match since battery temperature TB has sufficient margin against limitation start temperature Tlim. In other words, usual rapid charging is carried out during time t0-t1 and time t2-t3. In consideration of the temperature rise and the like by charging at time t4, it is expected that there will be no margin against limitation start temperature Tlim. Therefore, during time t4-t5, charging is carried out at a charging rate lower than that of usual rapid charging in order to avoid limitation on the running performance. Therefore, the charging completion time t5 in the waveform indicated by the solid line is behind the charging completion time in the waveform indicated by the broken line (the point where the temperature turns downwards from increase).

Similarly, since the charging during time t6-t7 and t8-t9 has a lower charging rate, the charging time in the waveform indicated by the solid line is longer than that in the waveform indicated by the broken line. However, since the occurrence of battery temperature TB reaching limitation start temperature Tlim is avoided, as indicated by the broken line waveform, the event of the running performance being limited or the charging being limited can be avoided.

Thus, although the time required for charging will become longer more or less, the event of operating the cooling fan to wait for the battery to cool down in order to restore the running performance can be avoided.

Second Embodiment

Figure 6:
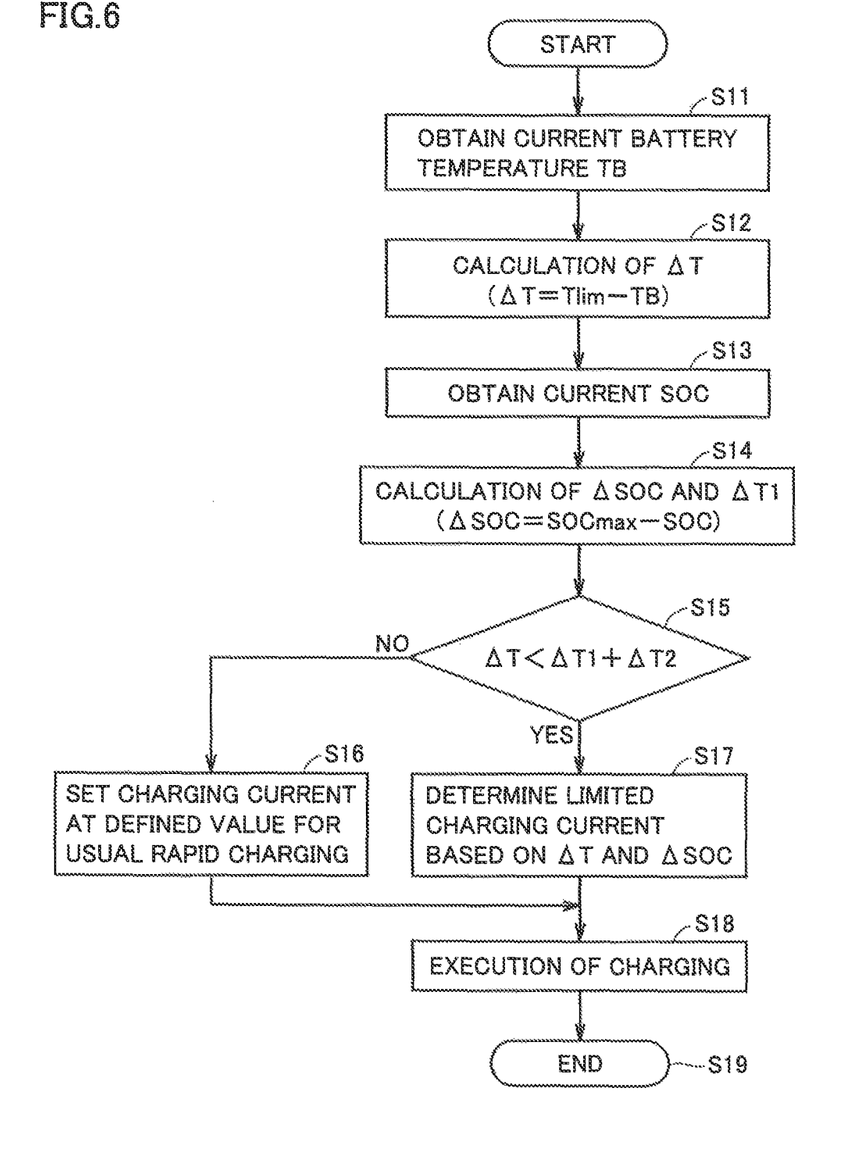
FIG. 6 is a flowchart to describe the process in a charging method executed in the second embodiment.

FIG. 6 is a flowchart to describe the process in the charging method executed in the second embodiment. In the second embodiment, rising temperature ΔT1 is set based on a difference ΔSOC between a full-charge amount and the current amount of charge, in addition to the temperature difference ΔT between limitation start temperature Tlim and battery temperature TB in rapid charging, to determine the charging rate for rapid charging.

Referring to FIG. 6, upon initiation of the process, the current battery temperature TB and intake air temperature TA are obtained at step S11. At step S12, the current battery temperature TB is subtracted from the limitation start temperature Tlim, as in the following equation (1) to obtain temperature difference ΔT, similar to the first embodiment.

$$\Delta T = Tlim - TB \tag{1}$$

At step S13, the current SOC of battery 10 is obtained. SOC is detected by a known method based on the accumulated value of current IB and/or voltage VB.

At step S14, the amount of charge ΔSOC that can be charged to attain a full-charge amount level from the current amount of charge level is obtained as shown in equation (3). SOCmax is the amount of charge set for a full-charge amount state (the SOC upper limit value of charging).

$$\Delta SOC = SOCmax - SOC \tag{3}$$

Further at step S14, temperature ΔT1 corresponding to the rise of the battery temperature when the charging corresponding to ΔSOC obtained by the calculation is applied to vehicle-mounted battery 10 in rapid charging. For example, the data of temperature rise width ΔT1 is measured for each ΔSOC in advance and stored in a map. At step S14, temperature ΔT1 is to be obtained by referring to this map.

At step S15, a determination is made as to whether the sum of temperature ΔT1 obtained at step S14 and temperature ΔT2 that rises in vehicle-running is larger than ΔT or not by the following equation (2), likewise with the first embodiment.

$$\Delta T < \Delta T1 + \Delta T2 \tag{2}$$

In the second embodiment, it is assumed that temperature ΔT2 is a fixed value. For example, temperature ΔT2 can be set as the temperature increasing width corresponding to the rise of the battery temperature when the vehicle is made to run at the maximum power until the battery SOC becomes 0% from the state of 100%.

When equation (2) is not met at step S15, control proceeds to step S16. When equation (2) is met at step S15, control proceeds to step S17. At step S16, the charging current is set at the defined value for usual rapid charging. At step S17, a limited charging current is determined based on temperature difference ΔT and amount of charge ΔSOC.

Figure 7:
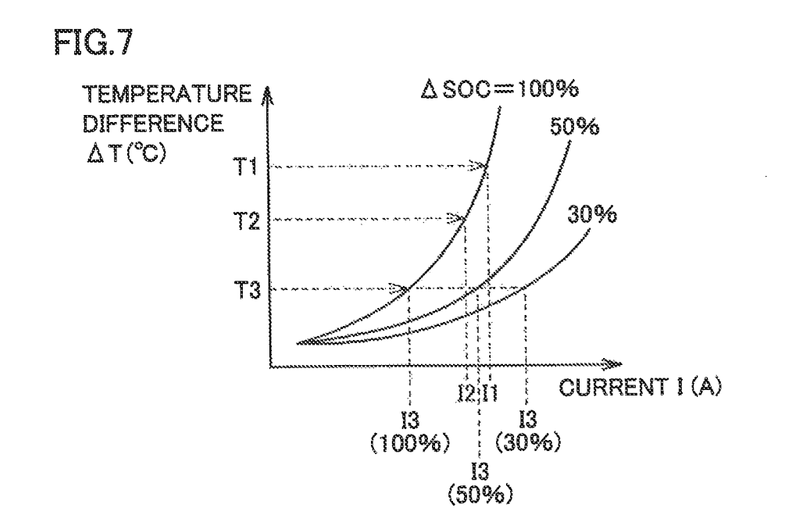
FIG. 7 represents an exemplary map employed in determining charging current at step S17.

FIG. 7 represents an exemplary map employed in determining the charging current at step S17.

Referring to FIG. 7, when ΔT=T1, T2 and T3 in the case where ΔSOC=100%, the charging current is determined as charging current I=I1, I2, I3 (100%), respectively.

There is a greater margin against limitation start temperature Tlim as ΔT is larger. Therefore, the level of the charging current can be set higher as a function of a larger ΔT.

In the case where ΔT=T3, the charging current is determined such as charging current I=I3 (100%), I3 (50%) and I3 (30%) when the amount of charge is ΔSOC=100%, 50% and 30%, respectively.

Since the amount of electric energy to be charged rapidly becomes greater as the ΔSOC becomes larger, the generated heat by the battery also becomes greater. Therefore, when temperature difference ΔT is equal, the level of charging current IB is set smaller as a function of a larger ΔSOC to suppress temperature increase in order to accommodate the vehicle running operation after charging.

Referring to FIG. 6 again, upon determining the charging current at step S16 or step S17, the battery is charged by the determined charging current at step S18, and the process ends at step S19.

The second embodiment takes into consideration the amount of charge ΔSOC. Therefore, even in the case where the amount to be charged before a fully charged state varies due to the running duration or running distance, limitation of the charging current is executed taking into account the variation. The charging current can be set to a level limited such that continuing the running operation is not disturbed. Therefore, the time required for charging become shorter than that of the first embodiment. Although the second embodiment has been described based on the case where the charging current is determined based on temperature difference ΔT and charging amount ΔSOC, the charging current may be determined taking into account intake air temperature TA, as in the first embodiment.

Third Embodiment

Figure 8:
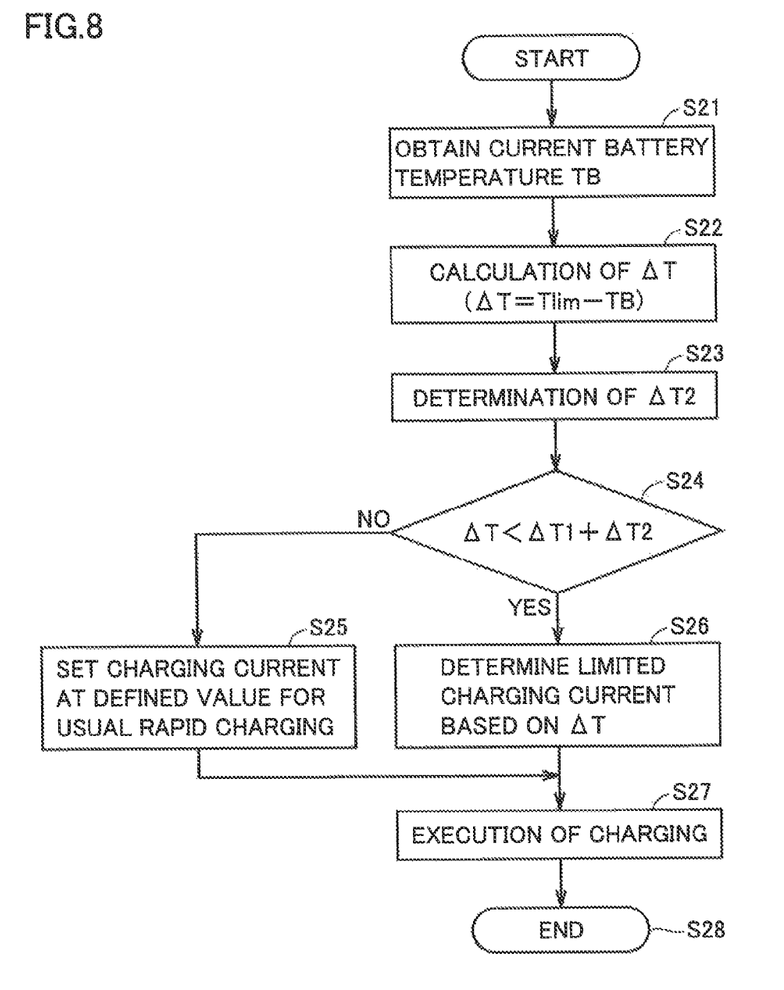
FIG. 8 is a flowchart to describe the process in a charging method executed in a third embodiment.

FIG. 8 is a flowchart to describe the process in the charging method executed in the third embodiment. In the third embodiment, the possible increasing temperature is set based on a temperature difference ΔT between limitation start temperature Tlim and battery temperature TB in rapid charging to determine the charging rate for rapid charging. At this stage, a temperature increase expected value ΔT2 in vehicle-running is set variable based on the running destination information, as well as information of the average current during the previous running operation, and the like to determine whether to limit the charging rate or not.

Referring to FIG. 8, upon initiation of the process, the current battery temperature TB is obtained at step S21. At step S22, the current battery temperature TB is subtracted from the limitation start temperature Tlim to obtain temperature difference ΔT, as in the following equation (1), likewise with the first and second embodiments.

$$\Delta T = Tlim - TB \tag{1}$$

At step S23, the temperature increasing during vehicle running ΔT2 is determined. In the first and second embodiments, temperature ΔT2 was set at a fixed value taking into consideration the battery temperature increase corresponding to the case where the vehicle motor was driven at the highest load for a long period of time. However, if it is known in advance that such driving will not be carried out, the level of the charging current may be increased to allow the charging period of time to be shortened.

For example, if the destination is set at a navigation device 6 of FIG. 1, what kind of road the vehicle will run after the charging station where the vehicle stops over for charging can be identified. Accordingly, ΔT2 is set at a high value in the case where the road includes an uphill or in the case where the distance up to the next charging station is far. Furthermore, in the case where the destination is close to the current location, or when the road towards the destination is flat from the current location, ΔT2 is set smaller than the aforementioned case.

Moreover, ΔT2 may be determined based on the actual running history. For example, ΔT2 can be determined by equation (4) set forth below based on the average current I from the previous charging to the current charging and battery temperature TB.

$$\Delta T2 = I^2 \times R(TB)/C \tag{4}$$

R (TB) represents the internal resistance of the battery at battery temperature TB, and C represents the heat capacity of the battery pack.

Further, $\Delta T2$ can be determined by the following equation (5) upon obtaining the required average power P by calculating the average road load based on the average vehicle speed from the previous charging to the present charging.

$$\Delta T2 = (P/V)^2 \times R(TB)/C \tag{5}$$

V represents the expected average voltage of the battery; R (TB) represents the internal resistance of the battery at battery temperature TB; and C represents the heat capacity of the battery pack.

Various modifications are possible for calculating $\Delta T2$. As an alternative to or in addition to the aforementioned example, variation in the battery cooling performance, variation in the cooling air and the like according to the average acceleration, vehicle speed area, and/or whether the air conditioner is operated or not may be taken into account.

At step S24, a determination is made as to whether the sum of the predetermined temperature $\Delta T1$ that rises in rapid charging and temperature $\Delta T2$ determined at step S23 is larger than $\Delta T$ or not by the following equation (2), likewise with the first and second embodiments.

$$\Delta T < \Delta T1 + \Delta T2 \tag{2}$$

When equation (2) is not met at step S24, control proceeds to step S25. When equation (2) is met at step S24, control proceeds to step S26. At step S25, the charging current is set at the defined value for usual rapid charging. At step S26, a limited charging current is determined based on temperature difference $\Delta T$.

Upon determination of the charging current at step S25 or step S26, the charging towards the battery is executed at step S27 at the determined charging current, and the process ends at step S28.

Setting the battery increase temperature $\Delta T2$ in vehicle-running variable as described in the third embodiment may be combined with the first or second embodiment. Accordingly, the charging current and charging duration can further be optimized.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 2 power supply; 4 charger; 6 navigation device; 10 battery; 20 inverter; 30 motor generator; 35 driving wheel; 37 wheel speed sensor; 42 voltage sensor; 44 current sensor; 45 intake air temperature sensor; 46 temperature sensor; 60 display device; 62 DC/DC converter; 64 air conditioner; 66 auxiliary battery; 68 auxiliary device; 70 intake port; 72 fan; 74 case; 76 discharge port; 100 electric powered vehicle.

The invention claimed is:

1. A charging device for charging a battery mounted on a vehicle by an external power supply, said vehicle configured to increase limitation on electric power charged to and discharged from said battery according to increase in temperature of said battery when said battery temperature exceeds a predetermined temperature, said charging device comprising:

a temperature sensor for detecting the temperature of said battery, a charger receiving electric power from said external power supply to charge said battery, and a control device controlling said charger such that said battery is charged at a charging rate determined based on a temperature difference between said predetermined temperature and said battery temperature, said vehicle on which said battery is mounted being capable of repeatedly executing a charging operation towards said battery from outside the vehicle and a vehicle-running operation, said control device determining said charging rate based on a temperature increase expected amount when said vehicle runs next time and said temperature difference.

2. The charging device according to claim 1, wherein said control device determines said charging rate based on a difference between an amount of charge corresponding to full charge of said battery and a current remaining amount of charge, and said temperature difference.

3. A charging method for charging a battery mounted on a vehicle by an external power supply, said vehicle configured to increase limitation on electric power charged to and discharged from said battery according to increase in temperature of said battery when said battery temperature exceeds a predetermined temperature, said charging method comprising the steps of:

detecting a temperature of said battery, calculating a temperature difference between said predetermined temperature and said battery temperature, and charging said battery such that charging of said battery is executed at a charging rate determined based on said temperature difference, said vehicle on which said battery is mounted being capable of repeatedly executing a charging operation towards said battery from outside the vehicle and a vehicle-running operation, said step of charging determining said charging rate based on a temperature increase expected amount when said vehicle runs next time and said temperature difference.

4. The charging method according to claim 3, wherein said step of charging determines said charging rate based on a difference between an amount of charge corresponding to full charge of said battery and a current remaining amount of charge, and said temperature difference.

* * * * *